Feb. 23, 1954
A. BERGERON
2,670,258
PISTON RING CONSTRUCTION
Filed Feb. 28, 1952
FIG. 1.
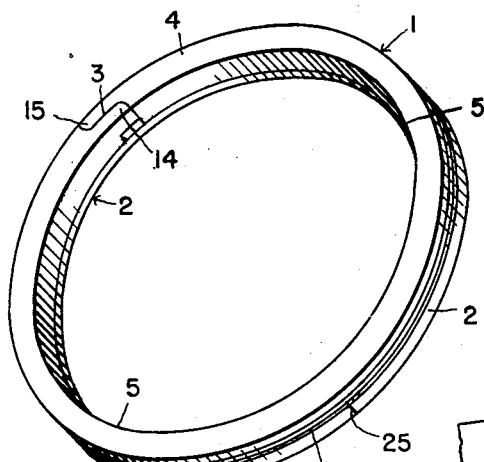
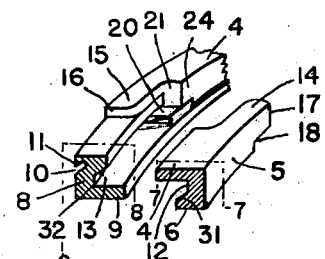
FIG. 6.
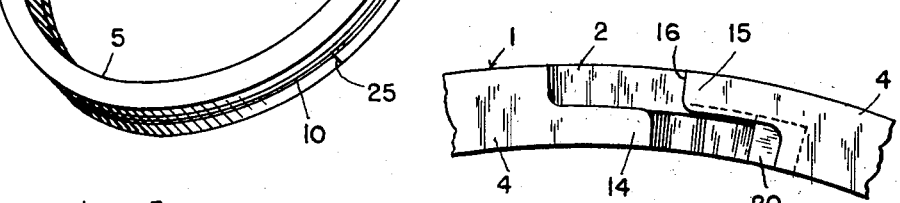
FIG. 2.
FIG. 5.
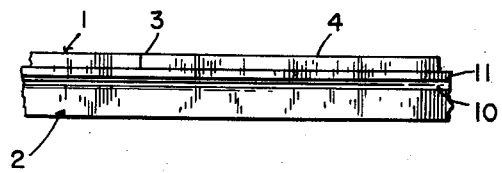
FIG. 3.
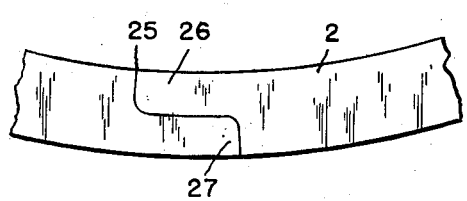
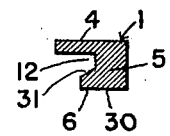
FIG. 7.
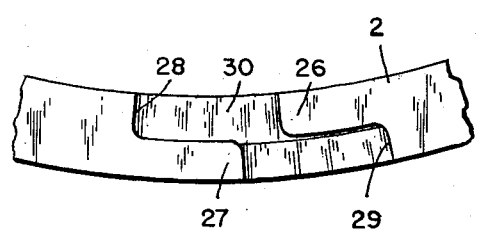
FIG. 4.
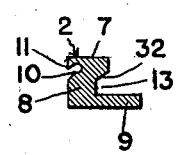
FIG. 8.
INVENTOR
ALFRED BERGERON
BY
ATTORNEYS Patented Feb. 23, 1954

2,670,258

UNITED STATES PATENT OFFICE 2,670,258

PISTON RING CONSTRUCTION

Alfred Bergeron, Dallas, Tex.

Application February 28, 1952, Serial No. 273,968

14 Claims. (Cl. 309—46)

This invention relates to piston rings and is particularly concerned with improvements in piston rings of the two-part type.

One object of the invention is to provide a ring consisting of interlocking ring members and having special provision for an interlocking joint between ring members, and between the ends of each ring member.

A further object of the invention is to provide a joint between the ends of the ring members which is substantially completely gas tight in directions both axially and radially of the ring.

An additional object of the invention is to provide a two-part interlocking ring, the sections or ring members of which are locked in place to keep the overlapping ends of one ring member on the opposite side of the overlapping ends of the other ring member.

A further object of the invention is to provide a ring comprising interlocking ring members, the construction of which adds flexibility to the ring as a whole, thereby giving to the ring better sealing qualities and longer life.

An additional object is to provide a ring which has no gaps in either an axial or a radial direction of the ring.

Other objects will appear hereinafter throughout the specification.

In the drawings:

Figure 1 is a perspective view of a piston ring embodying the novel features of the invention.

Figure 2 is a front elevation partly broken away.

Figure 3 is an enlarged bottom plan view of the structure shown in Figure 2 with the parts in closed position.

Figure 4 is a view similar to Figure 3 with the parts in open position.

Figure 5 is a view similar to Figure 4 but looking at the ring from the upper side thereof.

Figure 6 is a perspective view of the joint with the ring members separated from each other, the ring members being partly broken away and partly in vertical section.

Figure 7 is a sectional view of the upper ring member on the line 7—7 of Figure 6.

Figure 8 is a sectional view of the lower ring member on the line 8—8 of Figure 6.

With reference to the drawings, the numeral 1 indicates the upper ring member and 2, the lower ring member. The joint is indicated generally by the numeral 3. Both the upper and lower ring members are U-shaped in cross section as seen in Figures 7 and 8.

The upper ring 1 is provided with a top flange 4, a vertical body portion 5, and a lower flange 6, the latter being of less length than the top flange.

The lower ring member is provided with a top flange 7, a vertical body portion 8, and a lower flange 9, which latter is of greater length than the top flange. The vertical body portion of the lower ring is provided with an oil groove 10, having an overhanging lip 11, which, as the piston moves downwardly in the piston bore will wipe the cylinder wall of oil. Such a groove has been found to be very desirable for the reason that it insures that the wall is properly wiped during each reciprocation of the piston. By reference to Figure 7, it will be noted that the construction of the upper ring member provides a channel 12, and the lower ring member provides a channel 13. The lower flange 6 of the upper ring member extends into the channel 13 in the lower ring member.

The upper ring 1 is split at the joint and is provided with a pair of inter-engaging ends 14 and 15. Vertical faces 16, 17 and 18 are provided on the upper ring member.

Permanently located as by welding in the channel 13 of the lower ring member is a key 20. This key is located in the joint as shown in Figure 6 and forms a part thereof. As indicated in this figure, the vertical face 21 substantially bisects the top surface of the key 20. The inter-engaging end 14 of the top ring member has a vertical face 17 which, when the rings are compressed as shown in Figure 3, extends above the medial point of the key 20 in abutting relation with vertical face 21, and the said top flange 14 rests upon the key with the face 18 against or adjacent the vertical surface of the key. This key is permanently secured in the channel 13 of the lower ring as stated above and it forms a stop for preventing undue relative rotation movements between the two ring members when they are partly expanded. The ring members will have a limited rotational movement with regard to each other, but will be prevented from rotating to any extent when one, or both of them is in its expanded or partly expanded position.

The inner vertical face 24 of the upper ring member lies above the other vertical face of key 20.

The above construction insures that the ring is substantially gas tight in both an axial as well as a radial direction to thereby form a sealing ring which is so tight as to prevent the escape of explosive gases in the cylinder and to thus assist in compressing these gases before an explosion occurs.

It is contemplated to use several of these rings for each piston although under some circumstances a single ring may be employed.

With the trend toward higher compression in engines for the purpose of increasing the horse power, the bore and stroke of the cylinder and pistons have become progressively smaller. The present ring assists in holding the compression in such cylinders and also prevents dilution of the oil in the crank case.

The present invention eliminates the gap opening at the joint, and increases the flexibility of the ring due to the two-piece interlocking construction above described.

The ring may be made of any suitable material such as chrome alloy, or a ferrous ring may have a chrome face, or any other suitable metal may be used in the construction of the ring.

The lower ring member has a joint 25 as seen in Figures 1 and 3 comprising extensions 26 and 27 which fit into corresponding recesses 28 and 29 respectively. These slide on the under surface 30 of the upper ring member.

Preferably each channel 12 and 13 is provided with an inclined surface 31 and 32 respectively.

In order to facilitate an understanding of the invention, a single embodiment of the invention has been described above, and shown in the drawings, and specific language has been employed. It will, nevertheless, be understood that no limitation of the scope of the invention was thereby contemplated and that various alterations may be made such as would occur to one skilled in the art to which the invention pertains.

What is claimed is:

1. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, including a vertical step which overlies said key means, and inter-engaging ends having mating curved surfaces.

2. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said means which engages said key means having vertical surfaces.

3. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said means which engages said key means having vertical surfaces located in the channel of said one channel member.

4. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said joint including interlocking parts having axial and radial surfaces forming steps.

5. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said joint including interlocking parts having axial and radial surfaces forming steps, certain of said steps overlying said key means.

6. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said joint including interlocking parts having axial and radial surfaces forming steps, certain of said steps overlying the said key means at a medial portion thereof.

7. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, and an oil groove located in said lower ring member.

8. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said means which engages said key means having vertical surfaces, and an oil groove located in said lower ring member.

9. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said means which engages said key means having vertical surfaces located in the channel of said one channel member, and an oil groove located in said lower ring member.

10. A piston ring comprising an upper split ring member and a lower split ring member, each ring member having a channel, a key means rigidly mounted in one of said channels of the ring members, said ring members geing generally U-shaped in cross section and a joint for the ends of the other of said ring members, the said joint having means adapted to sealingly engage the said key means, the said joint including interlocking parts having axial and radial surfaces forming steps, and an oil groove located in said lower ring member.

11. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said joint including interlocking parts having axial and radial surfaces forming steps, certain of said steps overlying said key means, and an oil groove located in said lower ring member.

12. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said joint including interlocking parts having axial and radial surfaces forming steps, certain of said steps overlying the said key means at a medial portion thereof, and an oil groove located in said lower ring member.

13. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, including a vertical step which overlies said key means, and inter-engaging ends having mating curved surfaces, said upper and lower ring sections each having an elongated flange extending over the other ring section.

14. A piston ring comprising an upper split ring member and a lower split ring member, each ring member having a channel, a key means rigidly mounted in one of said channels of the ring members, said ring members being generally U-shaped in cross section and a joint for the ends of the other of said ring members, the said joint having means adapted to sealingly engage the said key means, the said means which engages said key means having vertical surfaces, said upper and lower ring sections each having an elongated flange extending over the other ring section.

ALFRED BERGERON.

References Cited in the file of this patent

UNITED STATES PATENTS

| Number | Name | Date |
|---|---|---|
| 1,538,758 | Taylor | May 19, 1925 |
| 1,549,104 | Bergeron | Aug. 11, 1925 |

FOREIGN PATENTS

| Number | Country | Date |
|---|---|---|
| 397,782 | Great Britain | Aug. 31, 1933 |
| 515,230 | Great Britain | Nov. 29, 1939 |